(12) United States Patent
Lind

(10) Patent No.: US 8,376,071 B2
(45) Date of Patent: Feb. 19, 2013

(54) DIRECT CURRENT DRIVE LAND VEHICLE

(76) Inventor: John A. Lind, Sarasota, FL (US)

( * ) Notice: Subject to any disclaimer, the term of this patent is extended or adjusted under 35 U.S.C. 154(b) by 667 days.

(21) Appl. No.: 12/453,225

(22) Filed: May 4, 2009

(65) Prior Publication Data

US 2010/0108416 A1    May 6, 2010

Related U.S. Application Data

(60) Provisional application No. 61/198,175, filed on Nov. 4, 2008.

(51) Int. Cl.
*B60K 1/04* (2006.01)
*G06F 19/00* (2011.01)
(52) U.S. Cl. .............. 180/65.31; 180/65.6; 701/22
(58) Field of Classification Search .......... 180/65.31, 180/65.51, 65.6, 68.5; 701/22
See application file for complete search history.

(56) References Cited

U.S. PATENT DOCUMENTS

| | | | | |
|---|---|---|---|---|
| 2,303,286 A | * | 11/1942 | Lake | 296/35.3 |
| 3,171,505 A | * | 3/1965 | Imelmann | 180/65.31 |
| 3,182,742 A | * | 5/1965 | Dow | 180/14.1 |
| 3,799,284 A | * | 3/1974 | Hender | 180/65.25 |
| 3,930,552 A | * | 1/1976 | Kunkle et al. | 180/68.5 |
| 4,351,405 A | * | 9/1982 | Fields et al. | 180/65.225 |
| 5,222,568 A | * | 6/1993 | Higasa et al. | 180/65.51 |
| 5,549,172 A | * | 8/1996 | Mutoh et al. | 180/65.1 |
| 6,100,615 A | * | 8/2000 | Birkestrand | 310/75 C |
| 6,483,198 B2 | * | 11/2002 | Schmitz et al. | 290/40 C |
| 6,880,856 B2 | * | 4/2005 | Chernoff et al. | 280/781 |
| 7,416,039 B1 | * | 8/2008 | Anderson et al. | 180/165 |
| 7,798,262 B2 | * | 9/2010 | Lundstrom | 180/14.1 |
| 2004/0210356 A1 | * | 10/2004 | Wilton et al. | 701/22 |
| 2005/0045392 A1 | * | 3/2005 | Maslov et al. | 180/65.5 |
| 2009/0093931 A1 | * | 4/2009 | Mizutani et al. | 701/42 |

* cited by examiner

*Primary Examiner* — J. Allen Shriver, II
*Assistant Examiner* — Bridget Avery
(74) *Attorney, Agent, or Firm* — John A. Lind

(57) ABSTRACT

Land vehicle with electric brushless DC motors attached to planetary gear final drives of modular design controlled by an ECU "electronic control unit. Electrical power is supplied by removable modular battery packs on a roll out tray and/or an Enginator an ICE "Internal Combustion Engine" with a Generator in one integrated unit running on combustible fuel. The body of the vehicle having a universal electrical connector that connect the drive-by wire chassis components to control the vehicle.

22 Claims, 4 Drawing Sheets

DIRECT CURRENT DRIVE LAND VEHICLE

BENEFIT OF EARLIER FILING DATE

This application claims benefit of the earlier filing date, Nov. 4, 2008, of Provisional Application No. 61/198,175: 'Fully Electric Drive Drive by Wire Modular Land Vehicle'; as the Invention disclosed therein by each is identical as is the sole Inventor thereof and Applicant therefore.

BACKGROUND OF THE INVENTION

1. Field of the Invention

The present invention relates: generally to land vehicles; more specifically to electric land vehicles; and most particularly to electric land vehicles with reversible field motors enabling regenerative braking whereby the kinetic energy of the moving vehicle is converted to electricity.

2. General Background

Reversible field motors have two polarities: motor and generator: respectively powered by electricity in drive or motor polarity, and generating electricity in braking or generator polarity, between the two opposed rotating electromagnetic fields (EMFs) required. The second rotating EMF is usually a product of alternating current induced by the first rotating EMF which is produced by alternating current (AC) supplied to the primary windings, usually in the stator. An EMF is produced by AC and a rotating EMF will induce AC in appropriately positioned, while rotating, secondary or field windings. For these fundamental factors reversible field motors capable of providing regenerative braking generally require alternating current.

But for a land vehicle to be able to store the energy converted, the AC generated by the reversible field motor in generator polarity must be converted to direct current (DC) for storage in batteries. The internal combustion engine (ICE) in a conventional automobile, moreover, is started with an AC electric motor that, with an alternator, routinely generates AC and converts it to DC to replenish the conventional 12 volt lead acid battery that is fully recyclable as mandated by Federal and State law and regulations and will easily last for decades if properly maintained: if the plates are simply kept submerged in electrolyte solution by adding distilled water as indicated.

Reversing the fields of an otherwise conventional electric starter motor enables regeneration of AC by this motor/generator in generating: i.e. braking; polarity, and converting AC into DC is routinely done in conjunction with an alternator for battery storage. Rather than taking shaft power of the ICE to run an alternator with a belt or chain, as historically done on conventional mass produced automobiles, the alternator of an integrated AC Motor Generator Alternator (ACMGA) is aligned with and coupled adjacent to a conventional transmission, between that transmission and the drive shaft of the ICE on more recent hybrid automobiles. But at this point one verges on the most pertinent known prior, contemporary, and even prospective art discussed directly below.

3. Discussion of the Pertinent Prior Art

In modern, i.e. computer or information age, reverse chronological order one begins with the yet to be manufactured Chevy Volt, announced in the summer of 2007, and proceeds to the Tesla, expected out this year: 2009. As advertised in 2007:

The Volt, with its revolutionary GM® E-Flex Propulsion System, is different than any previous electric vehicle because it will use a High-Energy Battery and range-extending onboard source that can run on gas, ethanol, or biodiesel to recharge the battery while driving. For someone who drives less than 40 miles a day, Chevy Volt will use zero gasoline and produce zero emissions. (emphasis added, 'Gas-friendly to gas-free.' Chevy ©2007 GM Corp., magazine advertising 'booklet' with 16 faces, 5 in.$^2$).

The Volt is expected to be a plug-in hybrid, with batteries rechargeable through an AC/DC converter yielding a range of forty miles and using an ICE to extend range. The "High-Energy Battery" will comprise Lithium-ion (Li-ion) batteries manufactured by LG of South Korea. And the drive will comprise split shaft transaxles with constant velocity joints to enable drive while steering: i.e. a conventional front end drive train; including conventional transmission.

The Tesla, expected later this year: 2009; will use a powerful DC reversible field motor (DCRFM), a new technology discussed in detail further below, coupled to a conventional rear wheel drive configuration with Borg-Warner transmission restricted to a single gear ratio of about 1:8.3 and a mega-cell, non-recyclable, assemblage of laptop type Li-ion batteries, with safety admittedly the largest design concern, requiring replacement within five years maximum and costing at least $30,000.

In consideration of less new, actually already on the road technology, the Honda Insight and the Toyota Prius are considered both true, as well as being non-plug-in, hybrid vehicles in utilizing an integrated ACMGA providing regenerative braking and electric drive though primarily using an ICE through the ACMGA in conventional, non-electric, drive. The prospective Volt is understood at present to favor an auxiliary enginator: an ICE coupled to an electric generator powering an ACMGA coupled to the conventional front wheel drive train; and might be considered fully electrically driven as opposed to a hybrid, if it actually existed today.

The ACMGA developed and used by Honda is widely recognized as the best known technology available today. Of a 'pancake' design Honda achieves over twenty percent (20%) greater efficiency over all previous reversible field motors by staggering the field poles, increasing modestly the thickness, but packing into the same diameter over twenty-five percent (25%) more EMF strength. Over twenty percent more power, in other words, is obtained by a geometrically efficient design. Geometry is important to electricity as current is carried on the surface of conductors and rotating opposed EMFs are required of reversible field motors required to provide regenerative braking which until very recently had been thought to require an AC motor.

In brief, Tesla is the only known exception to the pertinent prior art otherwise characterized by use of one reversible field AC motor/generator combined with an alternator to convert DC to AC and AC to DC. All the pertinent prior art, including Tesla, is characterized by powering the driven wheels with a single electric motor, with or without auxiliary ICE or enginator, coupled to a conventional central transmission splitting drive to the two driven wheels, front or rear. Tesla hence must be considered the most pertinent art known for use of a DC Reversible Field Motor (DCRFM) powered directly by a DC power source. The other pertinent art including the prospective Volt, despite intended plug-in capability, only achieves regenerative braking with an ACMGA and all the known pertinent art, prior and otherwise, utilizes or intends to utilize a conventional drive train including a conventional transmission whereby shaft power is transferred from a single source of shaft power through an entire drive train intended: i.e. designed and manufactured; for ICE drive.

The Tesla obviates the need for an ACMGA but at a price: its DC motor cannot drive a conventional transmission with multiple gearing ratios. The Tesla is 'drive by wire' but this in no way prohibits change of gearing on the otherwise conventional Borg Warner transmission restricted to a single gear ratio. The impediment is the electric motor which inherently has huge torque compared with an ICE: the Tesla needs the lowest gear ratio available on the strongest conventional transmission available because the electric motor has more than several times the torque of an ICE of equivalent horsepower. Use of low gearing exclusively is the most inefficient for the transmission and the drive train generally but the only 'off the shelf' option available to the Tesla because of the huge amount of torque inherent to an electric motor, particularly DC.

Overcoming inertia is considered the largest impediment to a fully electric land vehicle. A clutch makes physical contact to enable an ICE to move a vehicle from rest while an electric motor has only the opposed EMFs between stator and rotor windings. At initial start up any electric motor, in theory, has infinite voltage and no current. This practically impossible condition has historically been ameliorated by physically rotating the rotor, with armature windings, on an AC motor before energizing: cranking a vintage car by hand, kick starting a scooter engine, pull starting a mower or outboard ICE; while shunts were used on DC motors to overcome the infinite voltage zero current conundrum existing at start which is likened to the condition of a vehicle at rest: a condition of infinite mass relative to actual velocity.

Statement of Need

Electric drive of a full size land vehicle is considered in broad terms to demand a choice between huge electric power and battery pack to match as in the Tesla plus reliance upon the lowest gear available on a conventional transmission or reliance upon a conventional ICE as in the Toyota Prius or Honda Insight. The inherent characteristics of an electric motor are recognized as comprising a fundamental impediment to overcoming the inertia of a full sized land vehicle at rest just as an electric motor, by theory, has infinite voltage and zero current at start. Electromagnetic torque, essentially, is opposed to mechanical inertia.

A need is hence discerned for an economic avenue around or through this impediment: an electric automobile cannot sell for $30,000 if its battery pack costs $20,000; and this need further suggests a need for greater efficiency in transmission of shaft power in electric drive of a land vehicle: i.e. reduction in drive train friction and inertia; than that obtainable using a conventional central transmission intended for relatively low torque ICE shaft power.

SUMMARY OF THE INVENTION

Objects of the Present Invention

The encompassing object of the present invention is provision of an economic land vehicle readily manufactured in volume in the United States that is potentially benign ecologically and facilitative of an anticipated transition from petroleum to ecologically benign sources of electricity including wind and other solar sources.

The primary auxiliary object of the present invention is the obtainment of greater efficiency in both conversion of energy and transmission of shaft power than obtainable with a conventional drive train with a central transmission thus ameliorating the relative abundance of torque characterizing electric as opposed to internal combustion engine (ICE) shaft power in address of the impediment presented by the physical inertia of a full sized land vehicle at rest.

A secondary object auxiliary to said encompassing object of the present invention is regenerative braking capable of converting the kinetic energy of the moving vehicle into DC power storage.

A tertiary object auxiliary to said encompassing object of the present invention is the extension of range with an auxiliary DC power source.

Other objects ancillary to the present invention include ease in maintenance and maximization of utility.

Other objectives, especially regarding technical innovation, may be readily appreciated with a reading of the principles relating to the present invention following directly below.

Principles Relating to the Present Invention

In achievement of the above described objects and in view of the preceding review of the pertinent art it is considered that utilization of a conventional drive train: with a conventional central transmission developed for ICE drive; may be inappropriate for electric drive and that direct, or as direct as mechanically possible, coupling of one reversible field electric motor to each driven wheel would eliminate the incongruence of using a conventional, central, drive train intended for transmission of ICE shaft power to the driven wheels along with the associated cost, mechanical complexity, and inefficiency inherent thereto.

It is considered that elimination of a conventional central drive train would further entail the replacement of the single reversible field ACMGA currently utilized in hybrid land vehicles and achieve maximum efficiency in power transfer if each reversible field motor were closely coupled mechanically to each driven wheel. DCRFMs provides greater torque: inherently in comparison to an equivalently powerful ICE or AC motor; which combined with the gains in efficiency in shaft power transmission effectively address what is considered the largest problems facing a useful, economic, electric drive land vehicle and further provide the fundamental basis for enabling a transition in automotive technology broadly in the United States from hydrocarbon to solar power sources.

DC reversible field motor (DCRFM) technology is relatively recent as the rotating EMFs required are first necessarily produced by AC. Simple DC motors require brushes or other form of commutation, always a source of losses and maintenance trouble, and a DC generator was, until very recently, an oxymoron: only alternating current could be generated by a rotating electric machine. DCRFMs are hence also known as 'simulated' AC motors. The rotating EMF required is best simulated with three power lines in a fixed, for which reason the term 'stator' is used herein, field armature through which DC is fed, or derived in braking polarity, through two at any instant as directed by an electronic control unit (ECU) which mimics or simulates, and dissimulates in braking polarity, the AC wave form desired for conditions readily sensed with a Hall's Effect sensor or functional equivalent.

Lastly, with regard to the physical fundamentals required to achieve fulfillment of the principles relating to the present invention, it is considered that economics precludes the use of excessive horsepower geared down as low as possible to accommodate abundant electromagnetic torque and suggested that planetary gearing medial each DCRFM and wheel driven thereby be used for load balancing and overcoming physical rest inertia of the land vehicle: which is considered the most poignant expression of the fundamental problem facing an economic and practical electric drive land vehicle.

The above stated principles are further extended in the detailed discussion following generally along the avenue of practicality more particularly in the direction of achieving a versatile land vehicle especially with regard to the transition away from petroleum or hydrocarbon based fuels and most specifically toward efficient use of electricity in driving land vehicles: the precise direction followed in delineating the principles relating to the present invention.

Other advantages and benefits may be appreciated with a reading of the detailed discussion below particularly if made with reference to the drawings attached hereto using the reference numeral identified nomenclature common to both and following the brief description of said drawings.

NOMENCLATURE

| | | | |
|---|---|---|---|
| 10 | DC Drive Land Vehicle (DCDLV) | 31 | sensor |
| 11 | chassis | 32 | RF receiver |
| 12 | body | 33 | RF transmitter |
| 13 | wheel | 34 | alerting device |
| 14 | DC power storage | 35 | indicator |
| 15 | DC Reversible Field Motor (DCRFM) | 36 | AC/DC converter |
| 16 | DCRFM output shaft | 37 | multi-path connector |
| 17 | Electronic Control Unit (ECU) | 38 | rotary shaft coupling |
| 18 | planetary gearing | 39 | roll out tray |
| 19 | wheel shaft | 40 | lead acid batteries |
| 20 | rotor | 41 | winding wire |
| 21 | stator | 42 | compressed gas tank |
| 22 | field windings | 43 | photovoltaic array |
| 23 | power line | 44 | solar heat collector |
| 24 | auxiliary DC enginator | 45 | gas driven dynamo |
| 25 | Internal Combustion Engine (ICE) | 46 | AC connector |
| 26 | DC generator | 47 | circuit box |
| 27 | low voltage DC circuitry | 48 | Hydrogen Cell |
| 28 | internal gear | 49 | membrane |
| 29 | planetary gear | 50 | condenser |
| 30 | external gear | 52 | parabolic focus |
| 31 | solid fuel | 57 | computer |

DETAILED DESCRIPTION OF THE INVENTION
AND PREFERRED EMBODIMENT THEREOF

Figure 1:
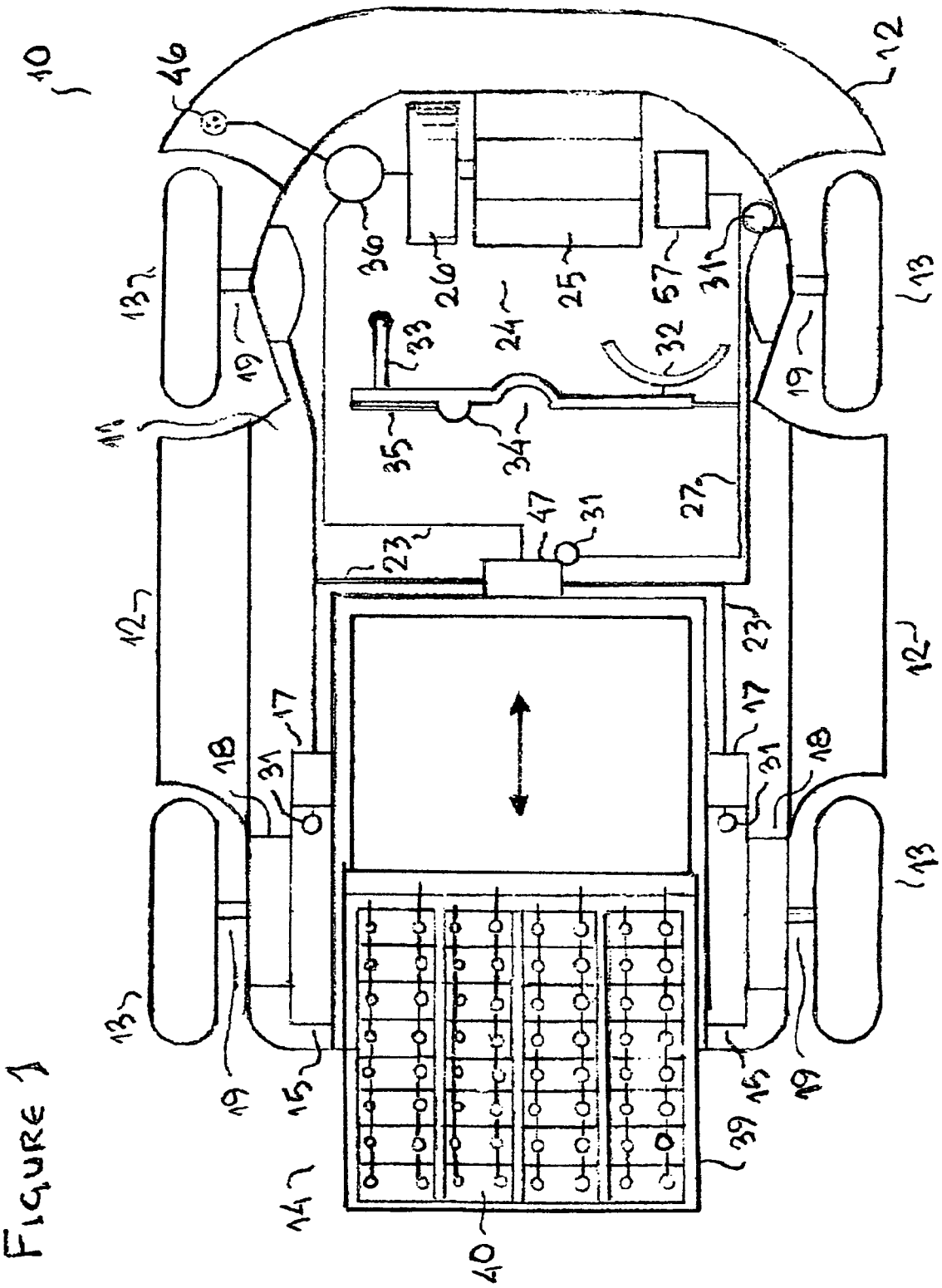
FIG. 1 is a horizontal sectional and plain elevation view taken from the top of a DC Drive Land Vehicle (DCDLV) 10 with a standard chassis 11 attached to a generic body 12 in accordance with the principles relating to the present invention with at least one wheel 13 powered with DC from DC power storage 14 by a DCRFM 15 through planetary gearing 18.
Figure 2:
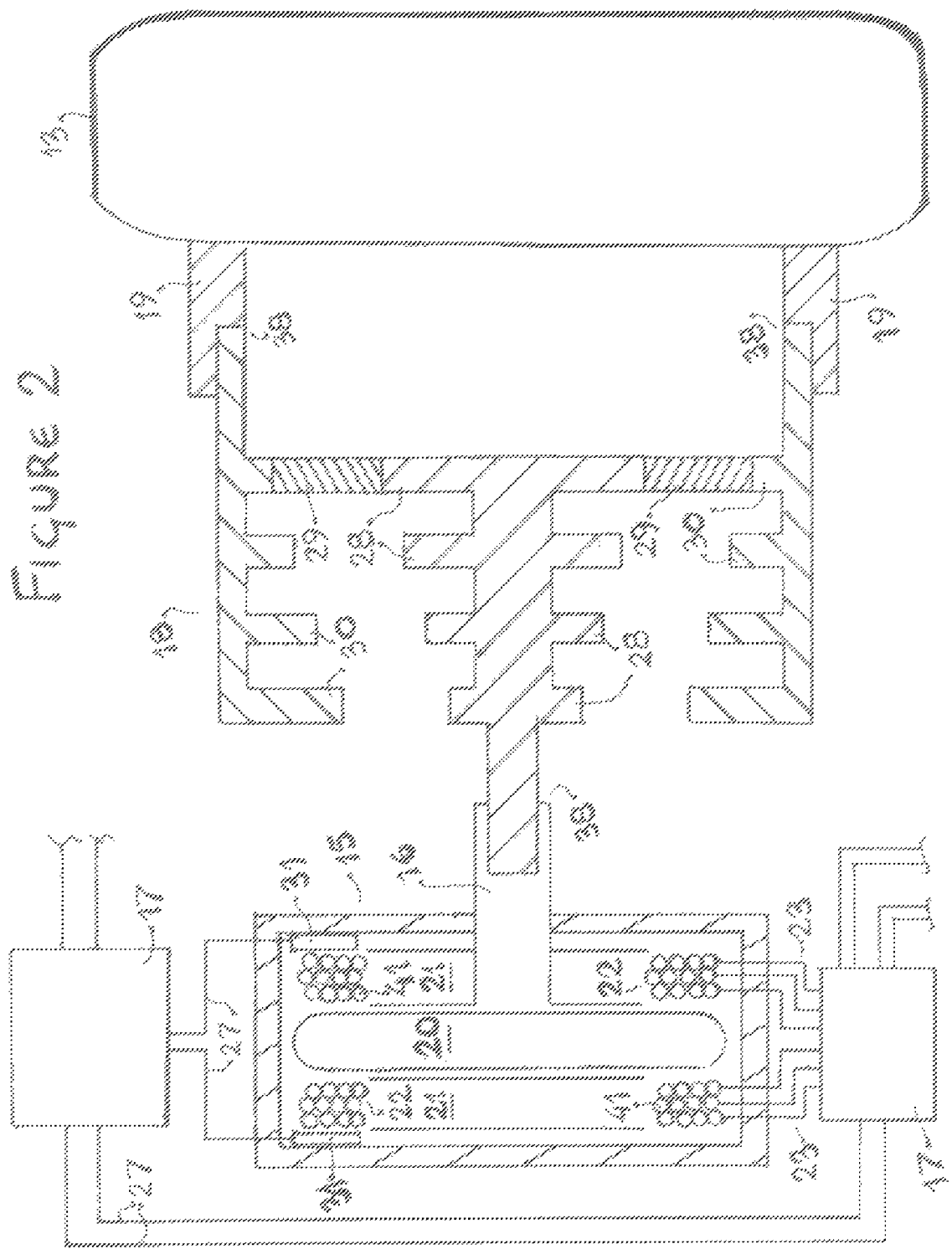
FIG. 2 is a horizontal sectional and plain elevation view taken from one DCRFM 15 coupled through planetary gearing 18 to a wheel 13 driven thereby as depicted in FIG. 1 and supplied with power through an ECU 17.
Figure 3:
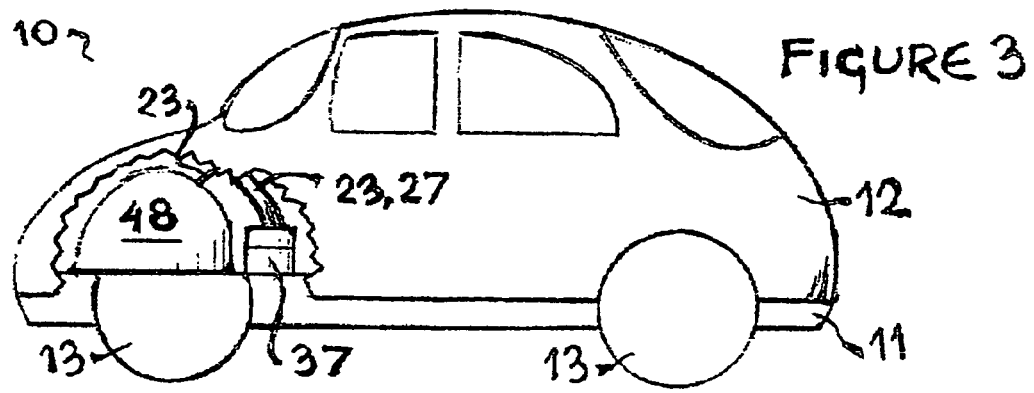
FIG. 3 is a plain elevation view taken from the side of a sedan model of the generic body 12 depicted in FIG. 1 cutaway to show a Hydrogen Cell 48 unit and, an enlarged for detail, multi-path connector 37.
Figure 5:
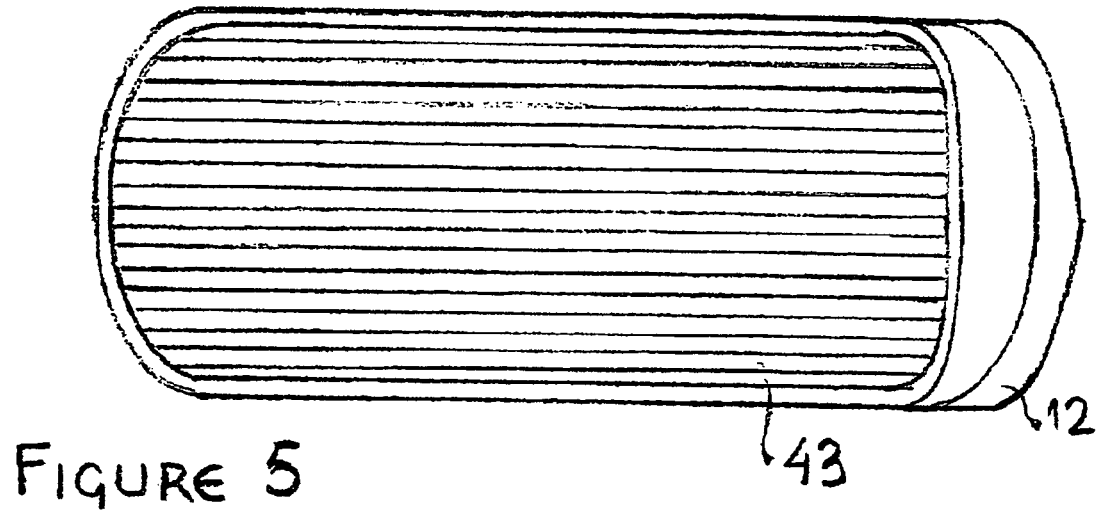
FIG. 5 is a plain elevation view taken from the top of a microbus model of the generic body 12 depicted in FIG. 1 depicting a photovoltaic array 43.
Figure 6:
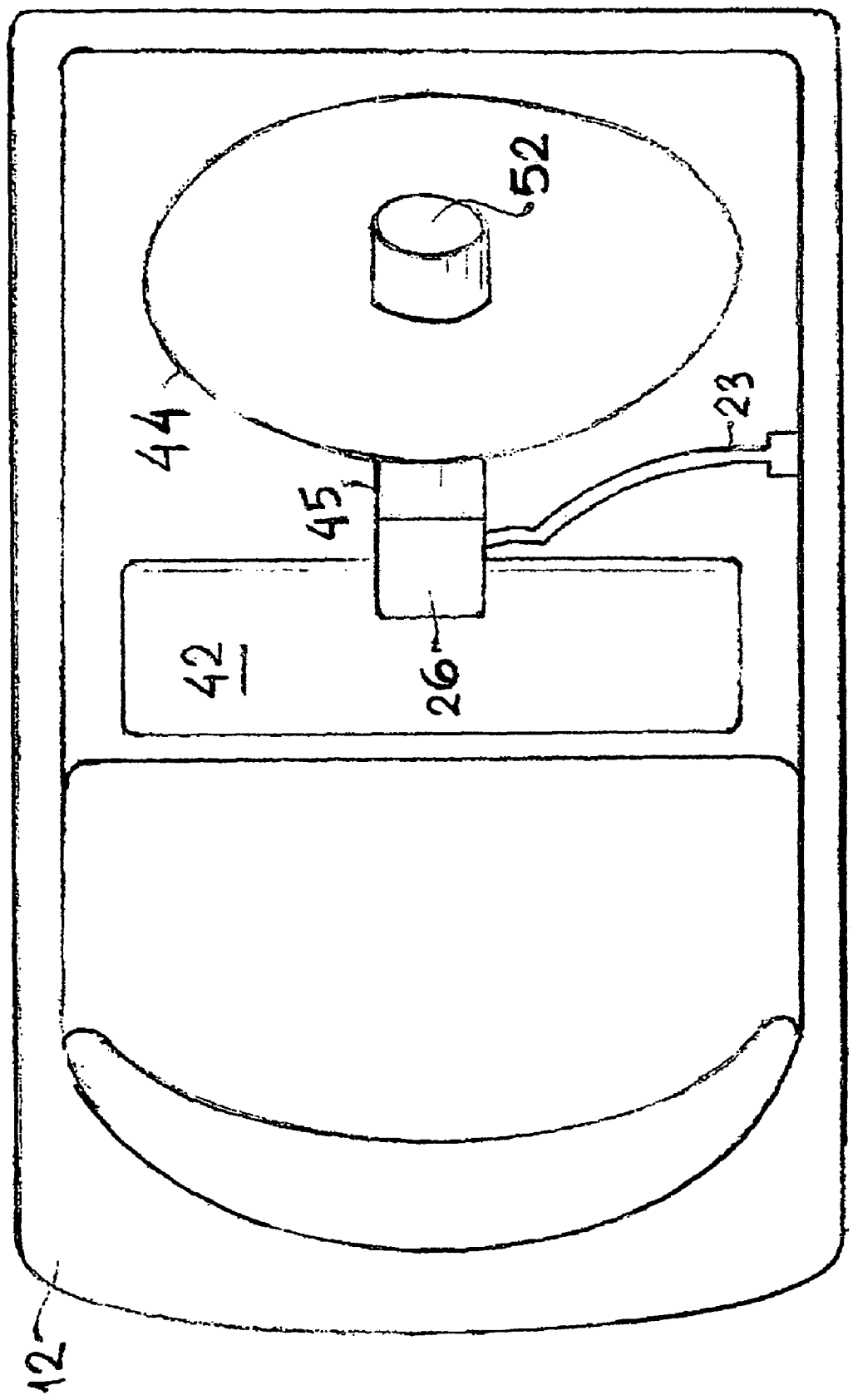
FIG. 6 is a plain elevation view taken from the top of an open bed truck model of the generic body 12 depicted in FIG. 1 depicting a compressed gas tank 42, a solar heat collector 44, and gas driven dynamo 45, in the open bed.

A direct current drive land vehicle (DCDLV) 10 in accordance with the principles relating to the present invention is seen in FIG. 1 with a chassis 11, and a body 12: preferably, but not necessarily, removably attachable to a standard chassis 11 and comprised of one of many different models of land vehicles, as suggested by the three models of bodies 12 shown FIGS. 3, 5 & 6; having fully electric drive in accordance with said principles and depicted in detail in FIG. 2, said electric drive having at least one DC reversible field motor (DCRFM) 15 with an output shaft 16 coupled to one wheel 13 driven by that DCRFM 15 through planetary gearing 18, providing regenerative braking and obviating the need for a conventional automotive drive train including central transmission.

DC power storage 14 is necessary to a DCDLV 10 in accordance with the principles relating to the present invention. The lead acid batteries 40 seen in FIG. 1 comprise the most preferred embodiment of DC power storage 14 in being the most readily available, economic, and environmentally benign form known. Lead acid batteries 40 of the same type used in conventional internal combustion engine (ICE) drive automobiles are fully recyclable as mandated by Federal and all fifty States' law and regulations. Lead acid batteries 40 will also last decades with proper maintenance: simply keeping the plates submerged by adding distilled water as indicated; and are still within the manufacturing capacity of the United States in volume. Li-ion batteries, alternatively, have a five year maximum lifespan, are not recyclable, and are only available in volume from South Korea.

Other types of DC power storage 14 including the compressed gas tank 42 combined with a gas driven dynamo 45 and DC generator 26 as seen in FIG. 6 may be substituted for the preferred lead acid batteries 40. And as seen in FIGS. 5 & 6 other types of DC sources: including a photovoltaic array 43 or a solar heat collector 44, the former providing DC directly, the latter powering the gas driven dynamo 45 and DC generator 26 seen in FIG. 6; are encompassed in embodiment of the principles relating to the present invention: i.e. the present embodiment; and a distinction between DC power storage 14 and source of that power observed. Batteries in general store power, chemically, that is readily available as DC. But the source of the power is typically hydrocarbon fuel in the U.S. as the lead acid batteries 40 in conventional automobiles are recharged constantly while the ICE is ruining if further charge can be taken.

A photovoltaic array 43 alternatively, converts energy from the sun: the true source of nearly all power save geothermal on earth; directly into DC and is hence considered ideal for the present embodiment except that the surface area available for a photovoltaic array 43 on a full size land vehicle, even in covering the microbus roof depicted in FIG. 5, is generally modest in comparison with the power required but as a range extender a photovoltaic array 43 is a significant and, depending on location, valuable consideration to embodiment of a DCDLV 10 in accordance with the principles relating to the present invention as being inherently far more efficient in power conversion than any automobile using a conventional drive train including central transmission. A photovoltaic array 43 is thus a range extender, not a form of DC power storage 14, and not required of fulfillment of the principles relating to the present invention.

The ICE 25 depicted in FIG. 1 is also a range extender, with its fuel comprising stored power, and only a component of an auxiliary DC enginator 24 comprised of an ICE 25 combined, integrated, coupled, or otherwise dedicated to driving a DC generator 26. A distinction between hybrid: with an ICE providing shaft power through a conventional transmission; and fully electric drive, wherein an ICE 25 is dedicated to production of electricity through a DC generator 26, is observed herein along with the significance of obviating the need for a conventional central transmission enabling fully electric drive.

DC power storage 14 must be provided to assure operational reliability and to store regenerated DC but the sacrifice of economics, recyclability, durability and homeland manufacture for weight by using Li-ion batteries rather than lead acid batteries 40 is discouraged as the weight required to yield a 100 km (62.5 miles) range for a DCDLV 10 is estimated at 1,020 lbs. using 32 conventional lead acid batteries 40 as depicted in FIG. 1 weighing thirty pounds each. Inertia at rest is specifically addressed with multiple gear ratios provided by planetary gearing 18, as shown in FIG. 2 and coupling the DCRFM output shaft 16 adjacent the driven wheel shaft 19: preferably aligned axially as shown.

Half a ton is a considerable weight but 100 km is a good range on lead acid batteries 40 alone for a land vehicle expected to carry a ¾ ton load or eight adults. It is noted that the lead acid batteries 40 depicted in FIG. 1 are located on a roll out tray 39 located low in the chassis 11 ensuring a low center of gravity, i.e. excellent stability, and excellent traction for the two rear wheels 13 driven in being disposed between the wheel shafts 19 of the rear wheels 13: a location impossible with a conventional rear wheel drive train.

This arrangement leaves the front wheels 13 free for any type of suspended steering desired and obviates the expense and inefficiencies of constant velocity (CV) joints required of conventional front wheel drive. Driving both rear wheels 13 has its drawbacks, however, particularly for regenerative braking as most of the braking load is upon the front wheels 13. It is for this reason that no distinction is made between front or rear wheels 13 or driven or non-driven wheels 13 in the nomenclature used herein: front wheel drive is recommended and the arrangement depicted in FIG. 1 is purely pedagogic in this regard by showing the simplest mechanical embodiment of the principles relating to the present invention. If, as braking load suggests, it is preferred to drive the front two wheels 13 or all four wheels 13 of a DCDLV 10 in accordance with the principles relating to the present invention, additional mechanical complexity is expected for suspended steering of the front wheels 13 and placing weight between the wheel shafts 19 driven is less easily achieved.

Driving the rear wheels 13 also facilitates use of a simple suspension for the rear wheels 13: over slung leaf springs, not shown, are recommended. Leaf, coil, and lever springs have drawbacks but will last forever and over slung leaf springs facilitate low disposition of the roll out tray 39 between the rear wheels 13. Since a driven wheel 13 is coupled to the output shaft 16 of a DCRFM 15 through planetary gearing 18 all of these components require suspension as a unit relative the chassis 11. Since both the DCRFM 15 and planetary gearing 18 desire the maximum diameter afforded by the wheel 13 driven suspension as a unit in particular and an under slung chassis 11, with semi-elliptic leaf springs over the planetary gearing 18, is considered best.

FIG. 2 represents the principles of operation of the electric drive used in a DCDLV 10 in accordance with the principles relating to the present invention. Each wheel 13 driven is coupled as directly as possible to the output shaft 16 of one DCRFM 15 through planetary gearing 18. This is seen in FIG. 1 along with the wheel shafts 19. The wheel shaft 19 in FIG. 2 is shown as being coupled with a rotary coupling 38 to the internal gears 28 of the planetary gearing 18 which engage planetary gears 29 that also engage external gears 30. Multiple gear ratios in transmission of shaft power are provided: four gear ratios may be discerned in FIG. 2; and, as emphasized in the crude representation of planetary gearing 18 depicted in FIG. 2, the gearing provided is inherently rigid and robust. Planetary gearing 18 can also automatically shift gears in accordance with torque requirements and this type is strongly recommended.

FIG. 2 also represents the operational principles of a DCRFM 15 with a permanent magnet rotor 20 in between two sets of field windings 22 in the stator 21 comprised of three wound winding wires 41 fed by power lines 23 through an ECU 17 that acts as a waveform simulator in motor polarity directing high voltage DC into, or from in braking polarity, two of the three winding wires 41 in each set of field windings 22, simulating or dissimulating AC to achieve the rotating EMF required. FIG. 2 emphasizes digital control by splitting the ECU 17 in two, connected by low voltage DC circuitry (LVDCC) 27. Digital control, using LVDCC 27, of much higher voltage and amperage DC through the power lines 23 is depicted therein. The ECU 17 receives and processes signal output from sensors 31 for current intensity, position, and hence rotational velocity, amplitude and wavelength. Hall Effect sensors 31 are recommended specifically for this in being reliable, inexpensive, and without appreciable losses.

The preceding endeavors primarily to detail embodiment necessary to achieving the principles relating to the present invention as the following endeavors primarily to detail embodiment considered advantageous to one practiced in the art for the purpose of making and using the present invention in a practical manner with an emphasis on the anticipation of a transition in the automotive industry from hydrocarbon based fuels to electricity.

FIG. 1 includes an auxiliary enginator 24 comprised of an ICE 25 combined with a DC generator 26 providing DC power through power lines 23, preferably from batteries 40 or other DC power storage 14 to the DCRFM 15 through a circuit box 47 which is simply suggested for electrical junctures including, as suggested for facilitating removable attachment of different model bodies 12 to a standard chassis 11, a single multi-path connector 37 as depicted in FIG. 3. The circuit box 47 depicted in FIG. 1 has a sensor 31 operationally connected thereto capable of sensing relevant operational parameters including voltage and amperage of the power lines 23 and signaling the same through LVDCC 27 to a digital computer 57 recommended for processing signal information and coordinating communications.

This digital computer 57 is also preferably connected, as further seen in FIG. 1, by LVDCC 27 to at least one indicator 35 and an alerting device 34: audio or visual or both as seen in FIG. 1: the convex protrusion on the 'dashboard' representing a visual indicator or light; the concavity representing an audio speaker. This communications computer 57 is also seen in FIG. 1 to be connected through LVDCC 27 to an RF transmitter 33 for transmitting to an exterior RF receiver relevant operational parameters including voltage and amperage levels obtained from at least one sensor 31.

As a purely practical matter it is recommended that, as further seen in FIG. 1 and in the interest of economic and practical design, a single computer 57 be utilized to co-ordinate all signals from all sensors 31, except for the sensors 31 seen in FIGS. 1 & 2 used by each ECU 17 for digital control of each DCRFM 15 as discussed above, and to coordinate output signals to relevant indicators 35, alerting devices 34, and RF transmitter 33. Automatic control of both the RF receiver 32 and the RF transmitter 33 seen in FIG. 1, is recommended specifically for reception and transmission, of signals from and to service stations to assist in location of the same and for remote and advance signaling of operational parameters as detected by sensors 31 particularly when a sensor 31 indicates an operational parameter exceeding normal range.

Monitoring of operational parameters by electronic sensors 31 and processing of signals from the sensors 31 by a computer 57 and indication in comprehensible operational levels to the driver is suggested along with alerting the driver, finding a service station, and automatically signally by RF to the closest service station operational levels exceeding a normal range. This capability is particularly desirable of a DCDLV 10 lacking any power source auxiliary to DC power storage 14 as the anticipated range with lead acid batteries 40 alone is, as previously discussed, expected to be 100 km or about one fifth of the range of an average conventional ICE powered automobile.

This minimal range will enable most commuters to drive to and from work with recharging of the preferred lead acid batteries 40 with 220V service through the AC connector 46 and AC/DC converter 36 seen in FIG. 1 expected to require ten hours. While full recharging of these lead acid batteries 40 at a service station with thirty-two times the voltage of the 220V household service available in the U.S. is, accordingly, expected to be accomplished in about twenty minutes, it is also suggested that a set of depleted lead acid batteries 40 in a DCDLV 10 operationally disposed upon a roller tray 39 or functional equivalent as seen in FIG. 1 be readily accessible for maintenance and readily removable at a service station for replacement by a fully charged set in less than ten minutes.

It is emphasized that the use of a roller tray 39 or functional equivalent enabling quick and easy access to DC power storage 14 is considered a practical option, much as conventional lead acid batteries 40 are recommended as a practical form of DC power storage 14 as discussed earlier, and suggested that any form of DC power storage 14 utilized in a DCDLV 10 in accordance with present principles be readily removed and replaced as a unit. In the case of the preferred lead acid batteries 40 it is suggested that a plate underneath the same be used and provision made for lifting this unit off the roller tray 39 or functional equivalent with an ordinary fork lift of sufficient capacity.

It is also recommended that, as suggested by the proximity of the circuit box 47 to the interior end of the roller tray 39 as seen in FIG. 1, that said circuit box 47 provide the functional electrical connection between the lead acid batteries 40 or other form of power storage 14 to the DCDLV 10 and that a sensor 31 be utilized to ensure that a functional connection exists between power storage 14 and the DCRFMs 15 possessed of the DCDLV 10. An alert from an alerting device 34 is recommended in the event this connection is not satisfactory and separate batteries for the signal processing computer 57 are also suggested, preferably with automatic recharging by an onboard DC power source. This is emphatically optional. If the connection between a sole DC power source 14 and the DCRFMs 15 is not made the fault is considered fairly obvious.

Most of all it is emphasized that use of conventional lead acid batteries 40: while comprising the preferred DC power storage 14 of a DCDLV in accordance with present principles for reasons discussed at length earlier; are not necessary for fulfillment of said principles and that other forms of auxiliary range extending technologies including but not limited to several discussed herein in detail: i.e. enginator 24, compressed gas tank 42 with gas driven dynamo 45 and DC generator 26, and the Hydrogen Cell 48 depicted in FIGS. 3-6; can be substituted as the sole DC power storage 14 rather than being auxiliary, just as other types of batteries including Li-ion or nickel cadmium, et cetera, can be used instead of lead acid batteries 40 as long as at least one form of DC power storage 14 is present for DC regenerated by the DCRFMs 15 in braking polarity.

Fuel for the ICE 25 of the enginator 24: hydrocarbon or alcohol, the content of a compressed gas tank 42, and the solid fuel 51 of the Hydrogen Cell 48 are each recognized as forms of DC power storage 14 while the photovoltaic array 43, a direct DC source, must rely on batteries for DC power storage 14 unless used to run a compressor, not shown, replenishing a compressed gas tank 42. The solar collector 44 is also a direct DC source though it can be used, as implied in FIG. 6, to compress gas, preferably air, with the gas driven generator 45 reversed to function as a compressor capable of storing power in the compressed air tank 42.

Figure 4:
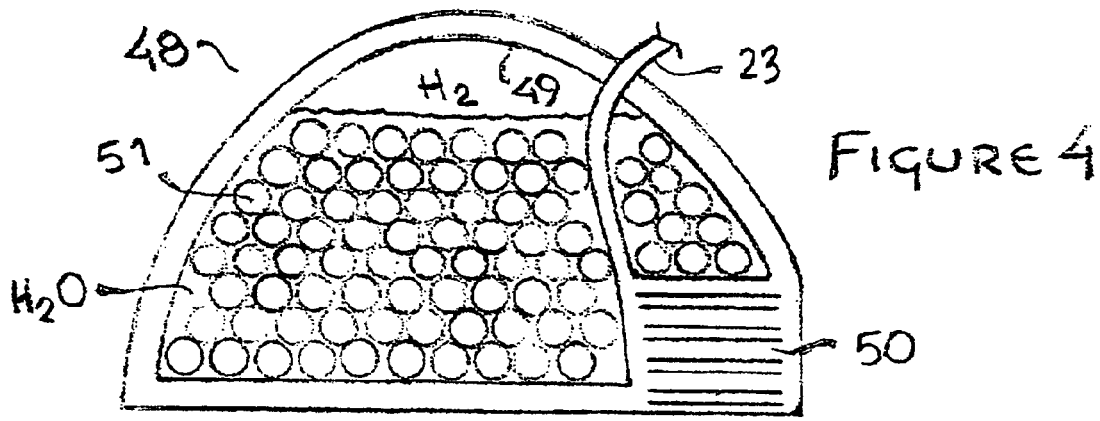
FIG. 4 is a cutaway view of the Hydrogen Cell 48 of FIG. 3 depicting use of Galium (Ga) coated Aluminum (Al) pellet catalytic solid fuel 51.

The Hydrogen Cell 48 represented in FIG. 3 is shown in further detail in FIG. 4 wherein a membrane 49 permeable to free electrons derived from hydrogen gas, $H_2$, is utilized between the $H_2$ source and the condenser 50 which provides DC through power lines 23. Any $H_2$ source is suitable including $H_2$ contained in a compressed gas tank 42 but it is specifically suggested that solid fuel 51 in aqueous submersion be utilized to convert water to free $H_2$ by oxidation in the $H_2O$. Gallium coated aluminum, Ga coated Al, is specifically recommended for the solid fuel 51. The gallium, in catalytic action, prevents a layer of oxide from forming as the aluminum oxidizes in water producing molecular free hydrogen and aluminum oxide in reaction with $H_2O$.

As seen in FIG. 4 only $H_2$ is produced and at least two advantages over other forms of hydrogen cell technology utilizing hydrolysis are realized. Free oxygen is a danger in itself and its production is avoided. More importantly solid fuel 51 is compact and, in pellet form as shown in FIG. 4, fluent and easily delivered to the Hydrogen Cell 48 through an appropriate orifice, not shown. The specific energy content of this solid fuel 51, most importantly, is relatively high and compares favorably with that of lead acid batteries 40.

Finally, with regard to the auxiliary DC power sources and alternate forms of DC power storage 14 described in detail herein the technologies represented in FIG. 6 are considered in detail. The compressed gas tank 42, in combination with the gas driven dynamo 45, comprises a form of DC power storage 14 if, as recommended, the gas driven dynamo 45 comprises a compressor in reverse polarity in essentially the same manner as a DCRFM 15 but in turbine form: i.e. with radial vanes axially integral to a DCRFM output shaft 16; thereby enabling DC regenerated in braking polarity by the DCRFMs 15 on the driven wheels 13 to compress air for storage in the compressed gas tank 42. The compressed gas tank can be initially filled with any gas, air being the most economic, to a higher pressure then that achievable by the onboard compressor and act, with the gas driven dynamo 45, as a DC source but without the capacity, until the pressure is below that achievable by the compressor, of acting as DC power storage 14.

The solar heat collector 44 concentrates, with a 3-D open parabolic form, the sun's radiation upon the parabolic focus 52 boiling fluid, water preferred, creating pressurized vapor driving the gas driven dynamo 45 which can be a reciprocating piston type: for the purposes of operation with both the solar heat collector 44 and, as an auxiliary or reserve, the compressed gas tank 42; but then with a mechanical linkage as by crank arms and shaft to the DCRFM 15 portion of the gas driven dynamo 45 in order to generate DC. In brief a turbine type gas driven dynamo 45 combined with DC generator 26 further preferably comprising a DCRFM 15 is preferred for DC generation by the compressed gas tank 42 while the solar heat collector 44, comprising a DC source and not DC power storage 14, is indifferent to reverse generator, i.e. motor, operation.

The power line 23 depicted in FIG. 6 is needed to convey the DC generated by the gas powered dynamo 45, in any case, and can be used directly to power each DCRFM 15 on each driven wheel 13 or to replenish batteries, preferably lead acid batteries 40, as required of the DCRFMs 15 if the power line 23 is appropriately connected thereto, preferably through a circuit box 47 that mainly provides suitable electrical connections to be safely made. It is suggested that the circuit box 47 have the capability of providing suitable connections for all auxiliary DC sources described herein including the DC enginator 26, Hydrogen Cell 48, photovoltaic array 43, and gas driven dynamo 45.

The foregoing is intended to enable one practiced in the art to practice and use an embodiment of the principles relating to the present invention and is in no manner to be considered as restrictive of scope of said invention or of the rights and privileges accorded Letters Patent in protection thereof.

I claim:

1. A land vehicle comprising: a chassis, a body, at least one driven wheel of at least three wheels, direct current (DC) power storage, and one DC reversible field motor (DCRFM) controlled by an Electronic Control Unit (ECU) driving each said driven wheel in motor polarity and converting vehicle kinetic energy in a reverse field braking polarity into regenerated DC fed into said DC power storage;

each said DCRFM possessing an internal permanent magnet rotor and external stator with field windings comprised of three winding wires with DC supplied thereto in motor polarity, and derived there from in braking polarity, through two of said three winding wires by said ECU in simulation of alternating current (AC) in motor polarity and dissimulation of AC into DC in reversed field braking polarity;

each said DCRFM having an output shaft coupled through planetary gearing to one said driven wheel;

wherein the DCRFM is positioned inward of the planetary gearing;

whereby the need for a conventional drive train with central transmission splitting drive to two wheels is obviated and fully electric drive with regenerative braking is provided.

2. The land vehicle of claim 1 wherein said DC power storage is comprised of batteries.

3. The land vehicle of claim 1 wherein said body may be chosen from a plurality of different models each removably attachable to a standard chassis.

4. The land vehicle of claim 1 wherein said DC power storage is located within said chassis.

5. The land vehicle of claim 1 having a computer and sensors connected by low voltage DC circuitry (LVDCC) capable of monitoring operational parameters including level of DC power storage and indicate the same through LVDCC to at least one indicator.

6. The land vehicle of claim 1 further having an onboard DC source other than said DC power storage.

7. The land vehicle of claim 2 where said batteries are comprised of lead acid batteries.

8. The land vehicle of claim 2 further having an AC/DC converter enabling recharging of said batteries with an external AC supply source.

9. The land vehicle of claim 2 having said batteries located within said land vehicle upon roll out trays facilitating access thereto.

10. The land vehicle of claim 3 facilitating removal and attachment of one said body chosen from a plurality of different models with disconnection and connection, respectively, of a single multi-path electrical connector between said body and said standard chassis.

11. The land vehicle of claim 4 wherein said DC power storage is located within said chassis upon roll out trays facilitating access thereto.

12. The land vehicle of claim 5 wherein said operational parameters monitored by said computer and said sensors have predetermined normal ranges which when sensed to exceed said normal ranges trigger automatic alerts with signals sent from said computer through LVDCC to at least one alerting device.

13. The land vehicle of claim 12 wherein said alerting device is aural.

14. The land vehicle of claim 12 wherein said alerting device is visual.

15. The land vehicle of claim 12 further having a RF receiver triggered by sensing an operational parameter exceeding normal range and receptive of RF signals assisting in location of a proximate service station.

16. The land vehicle of claim 12 further having a RF transmitter triggered by sensing an operation parameter exceeding normal range and transmitting by RF signal to a proximate service station.

17. The land vehicle of claim 6 wherein said onboard DC source is comprised of a DC enginator: an internal combustion engine combined with a DC generator.

18. The land vehicle of claim 6 wherein said onboard DC source is comprised of a photovoltaic array carried by said body.

19. The land vehicle of claim 6 wherein said onboard DC source is comprised of a solar heat collector and gas driven DC generator.

20. The land vehicle of claim 6 wherein said onboard DC source is comprised of a tank of compressed gas and a gas driven DC generator.

21. The land vehicle of claim 6 wherein said onboard DC source is comprised of solid fuel Hydrogen Cell.

22. The land vehicle of claim 21 wherein said solid fuel is comprised of gallium (Ga) coated aluminum (Al) pellets.

* * * * *